E. L. PEASE.
FLEXIBLE PROTECTOR FOR ELECTRIC CABLES AND LIKE PURPOSES.
APPLICATION FILED MAY 6, 1910.
996,515.
Patented June 27, 1911.
2 SHEETS—SHEET 1.
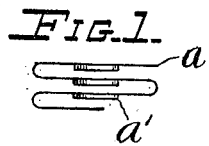
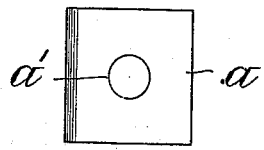
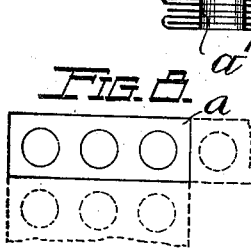
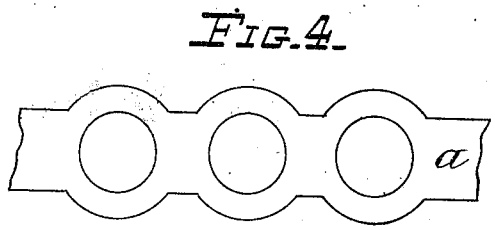
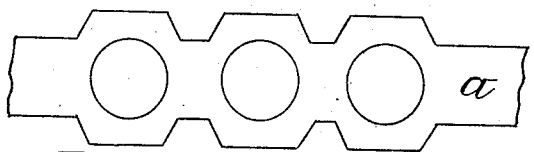
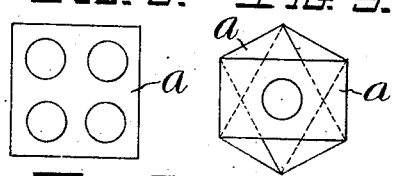
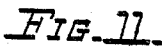
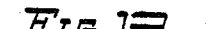
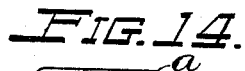
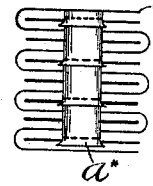
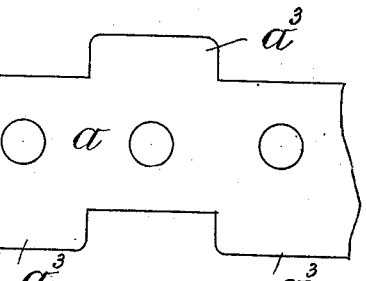

E. L. PEASE.
FLEXIBLE PROTECTOR FOR ELECTRIC CABLES AND LIKE PURPOSES.
APPLICATION FILED MAY 6, 1910.
996,515.
Patented June 27, 1911.
2 SHEETS—SHEET 2.
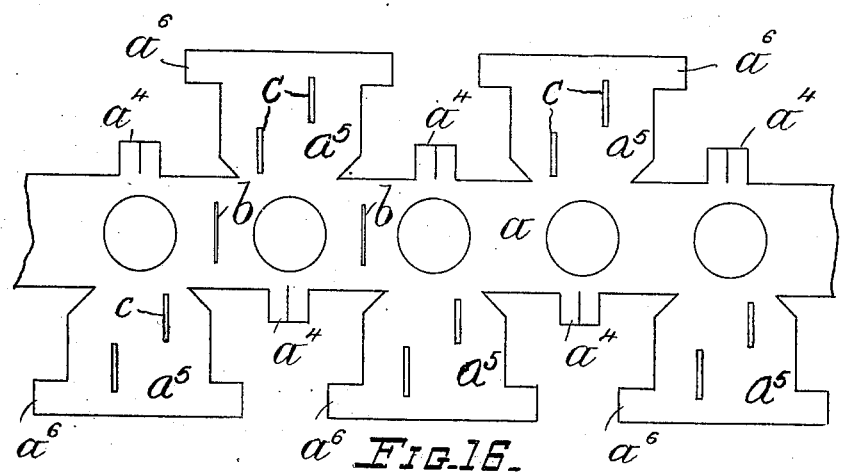
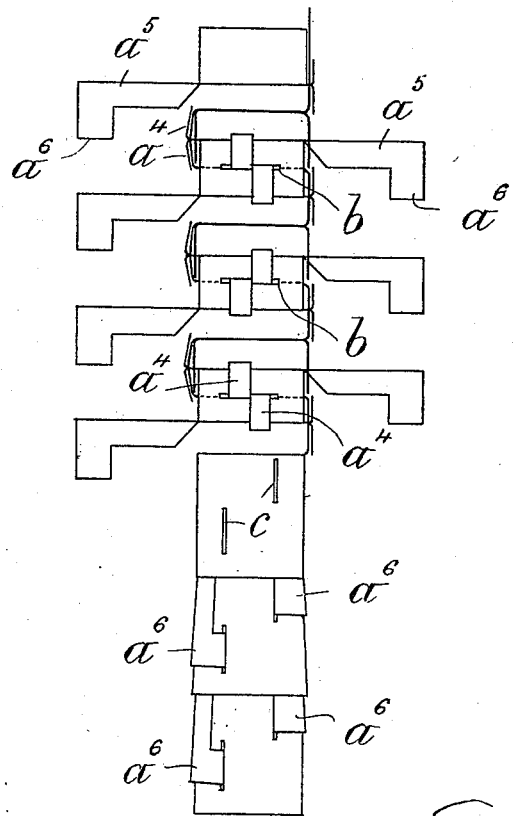

UNITED STATES PATENT OFFICE.

EDWARD LLOYD PEASE, OF DARLINGTON, ENGLAND.

FLEXIBLE PROTECTOR FOR ELECTRIC CABLES AND LIKE PURPOSES.

996,515. Specification of Letters Patent. Patented June 27, 1911.

Application filed May 6, 1910. Serial No. 559,819.

*To all whom it may concern:*

Be it known that I, EDWARD LLOYD PEASE, a subject of the King of Great Britain and Ireland, residing at Hurworth Moor, Darlington, in the county of Durham, England, have invented certain new and useful Improvements in Flexible Protectors for Electric Cables and the Like Purposes; and I do hereby declare the following to be a full, clear, and exact description of the invention, such as will enable others skilled in the art to which it appertains to make and use the same.

This invention relates to the construction of a sheathing or protector for electric cables and the like purposes, the object in view being to provide a sheathing which is uniformly flexible at every part, and is capable of resisting in a high degree the liability to be crushed out of shape or similarly injured when in use.

A further object of my invention is to provide a sheathing or protector with distance pieces so disposed that the different returns may keep the relative required distances apart, that is to say, I desire to be able to keep the strips at a greater distance apart and to prevent the cover compressing too much upon itself for cases where a continuous tube is not required, by means of tongues and slits made up of collars or flanges in contact, thereby effecting a saving of material and weight.

Having thus indicated the nature and object of my invention, in order that it may be clearly understood and readily carried into effect, I will proceed to describe the same, and for that purpose shall refer to the accompanying drawings, in which—

Figure 1 is a section and Fig. 2 a plan view of a strip prepared in accordance with my invention in its simplest form. Fig. 3 is a sectional view of the flexible protector when made up of two such strips folded over each other crosswise and interlocked together. Figs. 4 and 5 are plan views of strips cut to obtain a circular and octagonal form respectively. Fig. 6 is a plan view and Fig. 7 a sectional view of a strip having four holes for the accommodation of a like number of cables. Fig. 8 is a plan view of a strip having three holes for the accommodation of a like number of cables. Fig. 9 is a plan view and Fig. 10 a sectional view of a flexible protector made up of three strips taking an hexagonal form. Fig. 11 is a sectional view and Fig. 12 a side view of a flexible protector in which the sides extend in the form of alternating flanges which can be turned down for boxing in the four sides: Fig. 13 is a plan view of such a strip prepared for this purpose and Fig. 14 is a sectional view of a flexible protector in which short tube lengths are used in addition to or in place of the stamped flanges. Figs. 15 and 16 illustrate a modification of my invention as hereinafter described.

As shown in Figs. 1, 2 and 3, in its simplest form I take two strips $a$ of the same width, preferable of thin iron or steel or other suitable material, and bend or double them one over the other so that each strip takes a sinuous form as shown in Fig. 1 which is interlaced crosswise and interlocked at every bend with the other strip as shown in Fig. 3. But before bending the strips each strip is punched through at equal intervals along its center line, care being taken in punching the strip to draw the metal around the punched out hole into a ring or circular projection $a'$, which takes the reverse direction in each successive hole of the series. This will be easily understood by imagining the single strip in Fig. 1 to be opened out to its condition ready for bending. When the strips are doubled and interlocked in the manner shown in Fig. 3 it will be seen that the holes are all in line and that the circular projections or rings $a'$ extending therefrom abut against each other in the form of a continuous tube, which, by means of its collar or flange shaped projections will serve as a strong and flexible sheathing for electric cables and the like purposes. The flat parts of the two strips which make up a series of collars or flats $a^2$ to afford protection to the tube within, may take a variety of forms and depend in this respect mainly upon the way in which the strips have been cut away, or stamped out in the flat, and may be square as shown in Fig. 2, circular as shown in Fig. 4, or octagonal as shown in Fig. 5, or other form, and present externally a series of collars or flats $a^2$ extending edgewise from a corresponding series of intervening tubular projections $a'$.

This construction produces a section of sheathing inclosing a single tube, but I do not limit myself to either a particular section or a single tube, as two or more holes may be required to accommodate a like number of cables. For instance Figs. 6 and 7 illustrate four holes, while Fig. 8 illustrates three holes, in which case a strip of rectangular or other suitable section is formed, the dotted lines showing the comparative widths of the strips in the rectangular form. Also I do not limit myself to only two strips as more may be used, three strips taking the hexagonal form as shown in Figs. 9 and 10.

In the simple form hereinbefore described with reference to Figs. 1, 2 and 3, in which each side of the protector extends in the form of collars or flats, the strips can be bent over where an edge and not a return bend occurs, thus boxing in the four sides in the form of scales $a^3$ which overlap. In order to produce this, each strip is prepared with alternating extensions $a^3$ on either side as shown in Fig. 13, which can be turned down to the positions shown in Figs. 11 and 12.

Figs. 15 and 16 illustrate a modification of my invention which is chiefly intended to extend the pitch of the folds and relieve the close cross folding involved in the figures previously described, which means a saving of material at a loss to some extent of flexibility, owing to more interlocking and mutual friction of overlapping parts. Fig. 15 is a plan view of the plate cut out in the flat, two of which folded together make up the protector as shown in elevation in Fig. 16, the lower portion showing the complete folding, and the upper the earlier operation. Referring to these figures I take two strips $a$ cut to the shape shown and bend or double them one over the other in the manner already described but at greater distances apart. In order to secure the strips together at every bend, each strip is prepared with tongues or clips $a^4$ $a^4$ which are passed through horizontal slots $b$ formed in the sides of the strips wherever there is a return bend, one half of the said tongue or clip being turned up and the other turned down as shown in Fig. 16. These strips are prepared with alternating extensions $a^5$, which I bend down on alternate sides so as to form flanges which act as distance pieces. It is clear that the covering flange described and illustrated in the previous figures must vary in depth with the depth of these flanges, the punched out strips being prepared with extensions to form these flanges, but in cases where there might be a tendency for these flanges to open out on account of their length, I provide a corner $a^6$ on each extension, which can be bent over on the other face of the square to engage with the vertical slots $c$ in the flange below, to prevent a flange on that face from rising too much. I use this arrangement of turned up edge with or without the addition of short lengths of tube $a$ pressed into the holes punched in the strips as shown in Fig. 14 for more complete protection of the cable or air pipe inserted. It is not practicable to draw a flange of say more than ⅛ inch, therefore it will be found to be better where continuous protection is required to substitute short tubes, which may be of metal, vulcanite, or the like, and need not be fixed in both strips or in every perforation.

What is claimed is:

1. A sheath for electric conductors and the like comprising sinuous strips, having registering flanged apertures in the folds thereof providing the conductor path.

2. A sheath for electric conductors and the like comprising sinuous inter-engaging flat strips, and means disposed intermediate the folds thereof providing the conductor path.

3. A flexible sheath for electric conductors and the like comprising sinuous inter-engaging flat strips having flanged apertures provided in the folds thereof, said flanges having their edges in contact and providing the conductor path.

4. A sheath for electric conductors and the like comprising a sinuous flat strip having tongues and side extensions, said extensions adapted to lie against the folds of the strip and close the sheath, and said tongues adapted to engage within said extensions.

In testimony whereof, I affix my signature, in presence of two witnesses.

EDWARD LLOYD PEASE.

Witnesses:
G. L. MOFFAT,
E. NORMAN.

---

Copies of this patent may be obtained for five cents each, by addressing the "Commissioner of Patents, Washington, D. C."